(12) United States Patent
D'Aguanno et al.

(10) Patent No.: US 7,580,604 B2
(45) Date of Patent: Aug. 25, 2009

(54) ZERO INDEX MATERIAL OMNIREFLECTORS AND WAVEGUIDES

(75) Inventors: Giuseppe D'Aguanno, Huntsville, AL (US); Mark J. Bloemer, Athens, AL (US); Nadia Mattiucci, Huntsville, AL (US); Michael Scalora, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 237 days.

(21) Appl. No.: 11/278,521

(22) Filed: Apr. 3, 2006

(65) Prior Publication Data

US 2007/0237478 A1 Oct. 11, 2007

(51) Int. Cl.
*G02B 6/10* (2006.01)
*G02F 1/00* (2006.01)
*G02B 5/30* (2006.01)

(52) U.S. Cl. .................. 385/129; 359/321; 359/483

(58) Field of Classification Search .................. None
See application file for complete search history.

(56) References Cited

U.S. PATENT DOCUMENTS

| | | | |
|---|---|---|---|
| 2005/0031295 A1 | 2/2005 | Engheta et al. | |
| 2005/0221128 A1 | 10/2005 | Kochergin et al. | |
| 2006/0109540 A1* | 5/2006 | Kueks et al. | 359/321 |
| 2007/0014006 A1* | 1/2007 | Tanaka et al. | 359/487 |

OTHER PUBLICATIONS

V.G. Veselago, The Electrodynamics of Substances with Simultaneously Negative Values of epsilon and mu (republication in English), Soviet Physics USPEKHI, Jan. 1968 (English version), Jul. 1964 (original Russian), pp. 509-514, vol. 10, No. 4, Russian Academy of Sciences, Russia.

D.R. Smith et al., Composite Medium with Simultaneously Negative Permeability and Permittivity, Phys. Rev. Lett., May 1, 2000, pp. 4184-4187, vol. 84, No. 18, American Physical Society, U.S.

J. Pendry, et al., Magnetism from Conductors and Enhanced Nonlinear Phenomena, IEEE Trans. Micro. Theory & Tech., Nov. 1999, pp. 2075-2084, vol. 47, No. 11, Institute of Electrical and Electronics Engineers (IEEE), U.S.

(Continued)

*Primary Examiner*—Uyen-Chau N Le
*Assistant Examiner*—Chris Chu
(74) *Attorney, Agent, or Firm*—George O. Winborne

(57) ABSTRACT

We have shown that a single layer of a 3D Zero Index Material (ZIM) has omnidirectional reflection properties. In the range between the electric plasma frequency and the magnetic plasma frequency, ZIM reflect radiation for all angles of incidence and polarization with reflectivities of ~99%. In addition, with increasing angles of incidence, the reflecting band does not shift in frequency but actually widens. The operational bandwidth can be 100% or greater by increasing the separation between the electric and magnetic plasma frequencies. We have also shown that in the spectral region that allows the omnidirectional gap, ZIM can be used as the cladding of hollow waveguides with better performance than traditional hollow waveguides.

20 Claims, 12 Drawing Sheets

OTHER PUBLICATIONS

D. R. Smith, et al., Metamaterials and Negative Refractive Index, Science, Aug. 6, 2004, pp. 788-792, vol. 305, American Association for the Advancement of Science (AAAS), U.S.

J. B. Pendry, Negative Refraction Makes a Perfect Lens, Phys. Rev. Lett., Oct. 30, 2000, pp. 3966-3969, vol. 85, No. 18, American Physical Society, U.S.

E. Yablonovitch, Inhibited Spontaneous Emission in Solid-State Physics and Electronics, Phys. Rev. Lett., May 18, 1987, pp. 2059-2062, vol. 58, No. 20, American Physical Society, U.S.

S. John, Strong Localization of Photons in Certain Disordered Dielectric Superlattices, Phys. Rev. Lett., Jun. 8, 1987, pp. 2486-2489, vol. 58, No. 23, American Physical Society, U.S.

Y. Fink, et al., A Dielectric Omnidirectional Reflector, Science, Nov. 27, 1998, pp. 1679-1682, vol. 282, American Association for the Advancement of Science (AAAS), U.S.

J. P. Dowling, Mirror on the Wall: You're Omnidirectional After All, Science, Dec. 4, 1998, pp. 1841-1842, vol. 282, No. 5395, American Association for the Advancement of Science (AAAS), U.S.

D. Chigrin, et al, Observation of total omnidirectional reflection from a one-dimensional dielectric lattice, Appl. Phys. A Materials Science & Processing, Jan. 1999, pp. 25-28, vol. 68, No. 1, Springer-Verlag, Germany.

S. Hart, et al., External Reflection from Omnidirectional Dielectric Mirror Fibers, Science, Apr. 19, 2002,, pp. 510-513, vol. 296, No. 5567, American Association for the Advancement of Science (AAAS), U.S.

H. Jiang, et al., Omnidirectional gap and defect mode of one-dimensional photonic crystals containing negative-index materials, Appl. Phys. Lett., Dec. 29, 2003, pp. 5386-5388, vol. 83, No. 26, American Institute of Physics, U.S.

D. Bria, et al., Band structure and omnidirectional photonic band gap in lamellar structures with left-handed materials, Phys. Rev. E, Jun. 17, 2004, pp. 1-10, vol. 69, No. 066613, American Physical Society, U.S.

A. Yariv and P. Yeh, Optical Waves in Crystals: Propagation and Control of Laser Radiation, 1984, pp. 473-477, John Wiley & Sons, Inc., U.S.

P.W. Smith, A Waveguide Gas Laser, Appl. Phys. Lett., Sep. 1, 1971, pp. 132-134, vol. 19, No. 5, American Institute of Physics, U.S.

T.J. Bridges, et al., CO2 Waveguide Lasers, Appl. Phys. Lett., May 15, 1972, pp. 403-405, vol. 20, No. 10, American Institute of Physics, U.S.

P.K. Tien, et al., Novel metal-clad optical components and method of isolating high-index substrates for forming integrated optical circuits, Appl. Phys. Lett., Aug. 15, 1975, pp. 251-253, vol. 27, No. 4, American Institute of Physics, U.S.

E.A.J. Marcatili and R.A. Schmeltzer, Hollow Metallic and Dielectric Wave-guides for Long Distance Optical Transmission and Lasers, Bell Sys. Tech. J., Jul. 1964, pp. 1783-1809, vol. 43, Bell Labs, U.S.

J. Harrington and C. Gregory, Hollow sapphire fibers for the delivery of CO2 laser energy, Opt. Lett., May 15, 1990, pp. 541-543, vol. 15, No. 10, Optical Society of America, U.S..

J. Dai and J.A. Harrington, High-peak-power, pulsed CO2 laser light delivery by hollow glass waveguides, Appl. Opt., Jul. 20, 1997, pp. 5072-5077, vol. 36, No. 21, Optical Society of America, U.S.

Y. Matsuura and M. Miyagi, Er:YAG, CO, and CO2 laser delivery by ZnS-coated Ag hollow waveguides, Appl. Opt., Nov. 20, 1993, pp. 6598-6601, vol. 32, No. 33, Optical Society of America, U.S.

J.C. Knight, et al., Photonic Band Gap Guidance in Optical Fibers, Science, Nov. 20, 1998, pp. 1476-1478, vol. 282, No. 5393, American Association for the Advancement of Science (AAAS), U.S.

R.F. Cregan, et al., Single-Mode Photonic Band Gap Guidance of Light in Air, Science, Sep. 3, 1999, pp. 1537-1539, vol. 285, No. 5433, American Association for the Advancement of Science (AAAS), U.S.

S. O'Brien and J. Pendry, Magnetic activity at infrared frequencies in structured metallic photonic crystals, J. Phys.: Cond. Matter, Jun. 14, 2002, pp. 6383-6394, vol. 14, Institute of Physics, U.K.

S. O'Brien, et al., Near-infrared photonic band gaps and nonlinear effects in negative magnetic metamaterials, Phys. Rev. B, Jun. 2, 2004, pp. 1-4, vol. 69, No. 241101(R), American Physical Society, U.S.

J. Pendry, Manipulating The Near Field With Metamaterials, Optics & Photonics News, Sep. 2004, pp. 32-37, Optical Society of America, U.S.

S. Linden, et al., Magnetic Response of Metamaterials at 100 Terahertz, Science, Nov. 19, 2004, pp. 1351-1353, vol. 306, No. 5700, American Association for the Advancement of Science (AAAS), U.S.

R. A. Shelby, et al., Experimental Verification of a Negative Index of Refraction, Science, Apr. 6, 2001, pp. 77-79, vol. 292, No. 5514, American Association for the Advancement of Science (AAAS), U.S.

G. D'Aguanno, et al., Transmission Properties and Field Localization in a Negative Index Fabry-Perot Etalon (Proceedings of the Thirteenth International Laser Physics Workshop (LPHYS'04), Trieste, Italy, Jul. 12-16, 2004), Laser Physics, 2005, pp. 1-4, vol. 15, No. 4, Maik Nauka/Interperiodica Publishing, Russia.

G. D'Aguanno, et al., Bright and Dark Gap Solitons in a Negative Index Fabry-Perot Etalon, Phys. Rev. Lett., Nov. 16, 2004, pp. 213902-1 to 213902-4, vol. 93, No. 21, American Physical Society, U.S.

K. Popov, et al., Broadband high-reflection multilayer coatings at oblique angles of incidence, Appl. Opt., Apr. 1, 1997, pp. 2139-2151, vol. 36, No. 10, Optical Society of America, U.S.

M. Deopura, et al., Dielectric omnidirectional visible reflector, Opt. Lett., Aug. 1, 2001, pp. 1197-1199, vol. 26, No. 15, Optical Society of America, U.S.

E. Xifré-Pérez, et al., Porous silicon mirrors with enlarged omnidirectional band gap, J. Appl. Phys., Mar. 9, 2005, pp. 1-5, vol. 97, No. 064503, American Institute of Physics, U.S.

R. Ziolkowski and E. Heyman, Wave propagation in media having negative permittivity and permeability, Phys. Rev. E, Oct. 30, 2001, pp. 1-15, vol. 64, No. 056625, American Physical Society, U.S.

E. Palik, Ed., Handbook of Optical Constants, 1985, pp. 350-351,360, Academic Press, Inc., U.S.

W.H. Press, et al., Numerical Recipes in C, 1988, pp. 362-368, Cambridge Univ. Press, U.K.

B. Schwartz and R. Piestun, Waveguiding in air by total external reflection from ultralow index metamaterials, Appl. Phys. Lett., Jul. 5, 2004, pp. 1-3, vol. 85, No. 1, American Institute of Physics, U.S.

J. Pendry, et al., Extremely Low Frequency Plasmons in Metallic Mesostructures, Phy. Rev. Lett., 1996, pp. 4773-4776, vol. 76, No. 25, American Physical Society, U.S.

M. Bloemer, et al., Broadband omnidirectional reflection from negative index materials, Appl. Phys. Lett., Dec. 30, 2005, pp. 1-3, vol. 87, No. 261921, American Institute of Physics, U.S.

G. D'Aguanno, et al., TE and TM guided modes in an air waveguide with negative-index-material cladding, Apr. 5, 2005, pp. 1-7, vol. 71, No. 46603, Phys. Rev. E, American Physical Society, U.S.

A. Peacock and N. Broderick, Guided modes in channel waveguides with a negative index of refraction, Opt. Expr., Oct. 6, 2003, pp. 2502-2510, vol. 11, No. 20, Optical Society of America, U.S.

J. Pendry, et al., Low frequency plasmons in thin-wire structures, J. Phys.: Condens. Matt., 1998, pp. 4785-4809, vol. 10, Institute of Physics, U.K.

I. Shadrivov, et al., Guided modes in negative-refractive-index waveguides, Phys. Rev. E, 2003, pp. 1-4, vol. 67, No. 057602, American Physical Society, U.S.

* cited by examiner

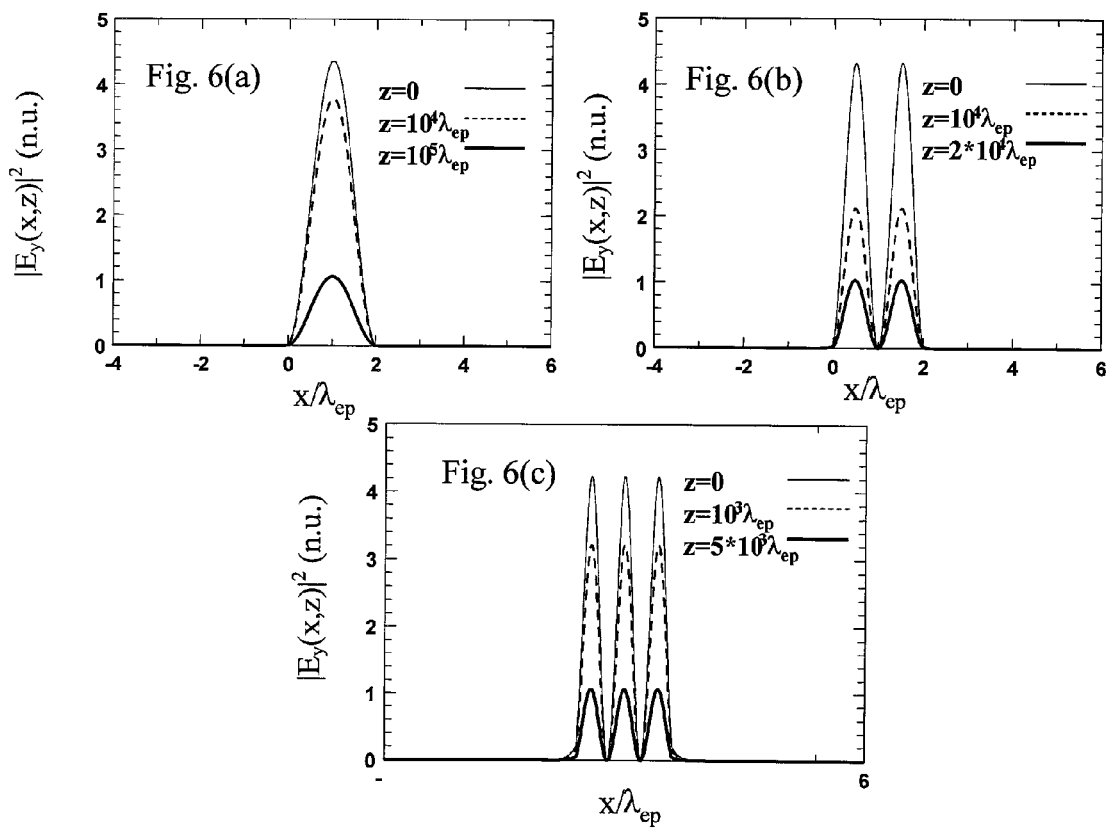

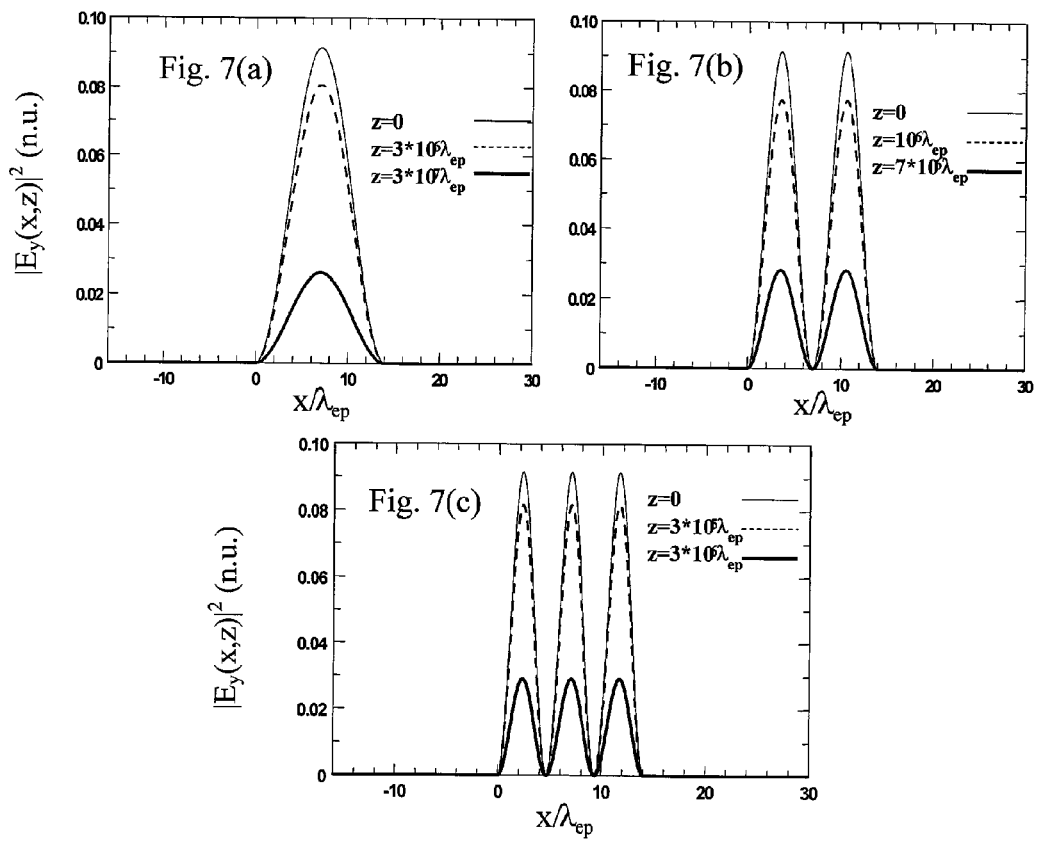

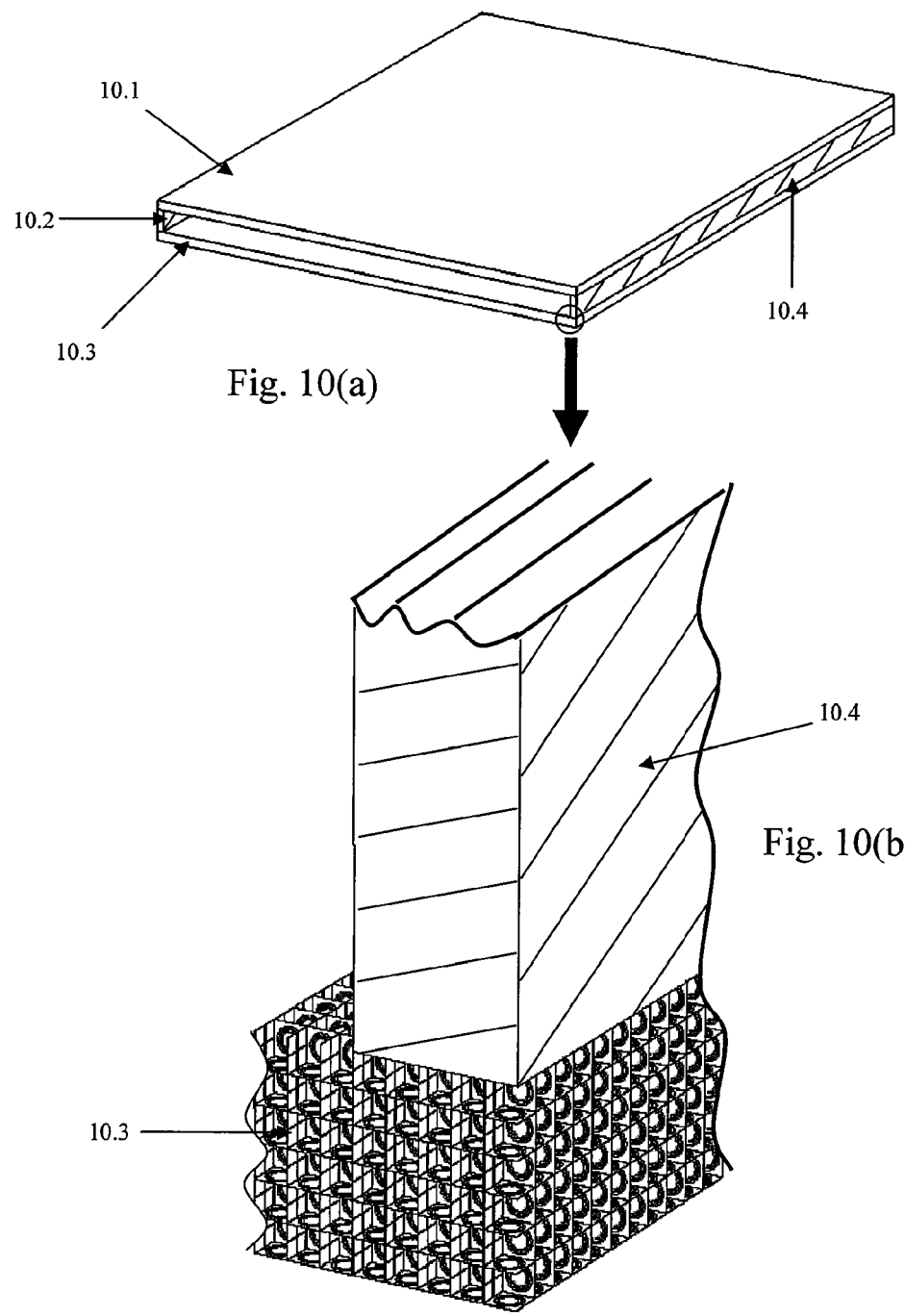

ZERO INDEX MATERIAL OMNIREFLECTORS AND WAVEGUIDES

GOVERNMENT INTERESTS

The invention described herein may be manufactured, used and licensed by or for the Government for governmental purposes without the payment to us of any royalties thereon.

BACKGROUND OF THE INVENTION

This invention relates to Zero Index Materials (ZIMs) (as defined herein) and significant improvements to omnidirectional reflector devices and hollow waveguides.

There have existed previously materials known as NIMs (Negative Index Materials). As their name connotes, NIMs are materials having a negative optical index of refraction. Such materials are not known to occur naturally but their theoretical possibility was shown by Veselago in 1968 [V. G. Veselago, *Sov. Phys. Usp.*, vol. 10, p. 509 (1968)]. Realization of an actual NIM waited until 2000 when D. R. Smith and co-workers [D. R. Smith, et al., *Phys. Rev. Lett.*, vol. 4, p. 4184 (2000)] experimentally tested an artificially constructed NIM, a so-called metamaterial, consisting of an array of split ring resonators proposed by Pendry and co-workers in 1999 [J. B. Pendry, et al., *IEEE Trans. Microwave Theory and Tech.*, vol. 47, p. 2075 (1999)]. Subsequently, the development of NIMs has occurred at an astounding pace due to the potential applications (see, for example, [D. R. Smith et al., *Science*, vol. 305, p. 788 (2004)]). NIMs have the property of refracting light in the opposite way with respect to which an ordinary material does [V. G. Veselago, *Sov. Phys. Usp.*, vol. 10, p. 509 (1968)] and it was predicted that they could be used to construct a "perfect" lens, i.e., a lens that can focus all Fourier components of a two dimensional (2D) image, even those that do not propagate in a radiative manner [J. B. Pendry, *Phys. Rev. Lett.* vol. 85, p. 3966 (2000)].

Until now omnidirectional reflector devices have been mainly designed by using the electromagnetic gap that is formed in periodic or quasi-periodic photonic band gap (PBG) structures made of positive index materials. (See, for example, [E. Yablonovitch, *Phys. Rev. Lett.*, vol. 58, p. 2059 (1987); S. John, *Phys. Rev. Lett.*, vol. 58, p. 2486 (1987); Y. Fink, et al., *Science*, vol. 282, p. 1679 (1998); J. P. Dowling, *Science*, vol. 282, p. 1841 (1998); D. N. Chigrin, et al., *Appl. Phys. A*, vol. 68, p. 25 (1999); S. D. Hart et al., *Science*, vol. 296, p. 510 (2002).]) (As used herein, with respect to electromagnetic radiation incident on a generally planar surface, the term "omnidirectional reflector" indicates that the reflector is generally capable of reflecting radiation incident at any angle from 90° (normal incidence) to almost 0° and for any polarization.) More recently, hybrid devices have been proposed made of alternating layers of positive and negative refractive index materials [H. Jiang, et al., *Appl. Phys. Lett.*, vol. 83, p. 5386 (2003); D. Bria, et al., *Phys. Rev. E*, vol. 69, p. 066613 (2004)].

In optics it is well known that when the inner layer of a planar waveguide is a gas with refractive index $n_0=1$ and it is sandwiched between two standard dielectric materials with refractive index n>1, total internal reflections cannot be achieved. The field coupled inside such a waveguide attenuates in the propagation direction by leaking power to the two bounding media [A. Yariv & P. Yeh, "Optical Waves in Crystals", John Wiley & Sons, New York, pp. 473-77 (1984)]. The losses suffered via these "leaky" modes may be balanced when the molecular gas in the core is an active medium, as, for example, in $CO_2$ waveguide lasers [P. W. Smith, *Appl. Phys. Lett.*, vol. 19, p. 132 (1971); T. J. Bridges, et al., *Appl. Phys. Lett.*, vol. 20, p. 403 (1972)]. In metal-clad waveguides the refractive index of the guiding layer can be arbitrarily low as long as it is greater than the refractive index of the substrate [P. K. Tien, et al., *Appl. Phys. Lett.*, vol. 27, p. 251 (1975) incorporated by reference]. Total internal reflections are always achieved thanks to the low refractive index of the metal. In Tien, guiding was demonstrated in an air-polystyrene -silver waveguide at optical frequencies, in a 1.81 μm thick polystyrene film. [Id.] Losses were estimated by those authors at approximately 1 dB/cm for the fundamental transverse electric (TE) mode.

The theory of hollow waveguides was developed in E. A. J. Marcatili and R. A. Schmeltzer, *Bell Syst. Tech. J.*, vol. 43, p. 1783 (1964), and different types of hollow waveguides in the infrared have been realized over the years. Some examples are hollow sapphire fibers [J. A. Harrington and C. C. Gregory, *Opt. Lett.*, vol. 15, p. 541 (1990)], hollow Ag/AgI coated glass waveguides [J. Dai and J. A. Harrington, *Appl. Opt.*, vol. 36, p. 5072 (1997)], and ZnS-coated Ag hollow waveguides [Y. Matsuura and M. Miyagi, *Appl. Opt.*, vol. 32, p. 6598 (1993)]. These guides have losses as low as 0.1 dB/m at 10.6 μm, for a bore diameter of approximately 1000 μm.

In the visible region, a tremendous breakthrough in the possibility of confining light in air was achieved in 1999, with the introduction of so-called photonic crystal fibers (PCFs) [J. C. Knight, et al., *Science*, vol. 282, p. 1476 (1998); R. F Cregan, et al., *Science*, vol. 285, p. 1537 (1999)]. In a PCF, light confinement does not require a core with a higher refractive index because guidance is achieved not by total internal reflection, but by the presence of a cladding in the form of a full two-dimensional photonic band gap.

SUMMARY OF THE INVENTION

Exemplary embodiments of the present invention utilize what are called herein Zero Index Materials or ZIMs. We refer here to ZIMs as NIM-like materials because they do not, strictly, have a negative index of refraction but rather have essentially zero real refractive index as defined herein. As used here, "Zero Index Materials" or "ZIMs" refer to metamaterials having a real index of refraction of absolute magnitude less than approximately $10^{-2}$, i.e., $|n| < \approx 10^{-2}$. With the term "NIM-like materials" we refer to artificially constructed or metamaterials including NIMs and ZIMs.

We demonstrate below that such ZIMs in accordance with the present invention have omnireflecting properties. In another embodiment of the invention, the frequency bandwidth for omnireflective behavior may be controlled.

In another embodiment of the invention, light can be confined in air by using a waveguide where the bounding medium, or cladding, is made of a ZIM in accord with the present invention. In this case the confinement is due, as in classical waveguides, to total internal reflections. Thanks to the dispersive properties of ZIMs, exemplary embodiments of such waveguides may have attenuation lengths one or two orders of magnitude longer than classical hollow waveguides. Moreover, based on recent advancements in the field of negative index materials [S. O'Brien and J. B. Pendry, *J. Physics: Condens. Matter*, vol. 14, p. 6393 (2002); S. O'Brien, et al., *Phys. Rev B*, vol. 69, p. 241101(R) (2004); Pendry, *Opt. and Photon. News*, vol. 15, No. 9, p. 33 (2004); S. Linden et al., *Science*, vol. 306, p. 1351 (2004); Kochergin, Patent Application US 2005/0221128], we believe that ZIM waveguides in accordance with the present invention can be designed to operate in a range spanning from the mid to far infrared electromagnetic spectrum.

DESCRIPTION OF THE DRAWINGS

FIG. 1 Optical constants of a broadband omnidirectional reflector.

FIG. 4 TE and TM reflectivity vs. the angle of incidence at $\omega_c$, i.e. at the central frequency of the gap.

FIG. 6 Transverse profile of the TE guided modes at different propagation distances for a waveguide whose air core has a thickness $d=2\lambda_{ep}$, $\lambda_{ep}=2\pi c/\omega_{ep}$. The frequency of the field is $\omega=0.88\omega_{ep}$. FIG. 6(a) is $TE_0$ mode. FIG. 6(b) is $TE_1$ mode. FIG. 6(c) is $TE_2$ mode. The electric field is expressed in normalized units according to the following normalization condition:

$$\int_{-\infty}^{+\infty} |E_y(x, z=0)|^2 \, dx = 1.$$

FIG. 7 Transverse profile of the first three TE guided modes at different propagation distances for a waveguide in accord with the present invention whose air core has a thickness $d=14\lambda_{ep}$. FIG. 7(a) is $TE_0$ mode. FIG. 7(b) is $TE_1$ mode. FIG. 7(c) is $TE_2$ mode. The electric field is expressed in normalized units according to the following normalization condition:

$$\int_{-\infty}^{+\infty} |E_y(x, z=0)|^2 \, dx = 1.$$

Figures 8A, 8B:
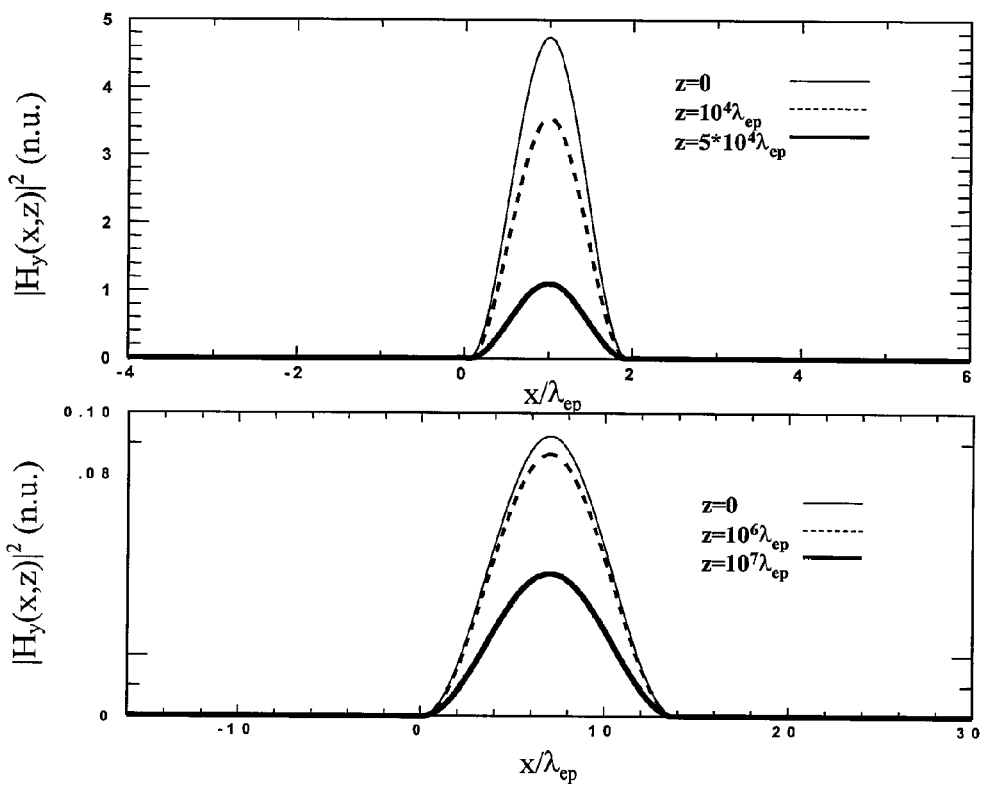

FIG. 8. Transverse profile of the $TM_0$ mode for different propagation distances. A waveguide in accord with the present invention has an air core of thickness respectively: FIG. 8(a) $d=2\lambda_{ep}$, FIG. 8(b) $d=14\lambda_{ep}$. The magnetic field is expressed in normalized units according to the following normalization condition:

$$\int_{-\infty}^{+\infty} |H_y(x, z=0)|^2 \, dx = 1.$$

Figure 9A:
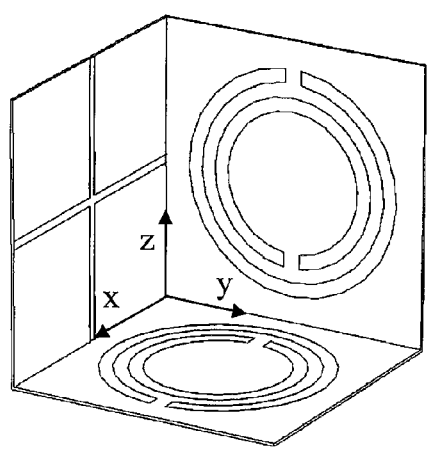
Figure 9B:
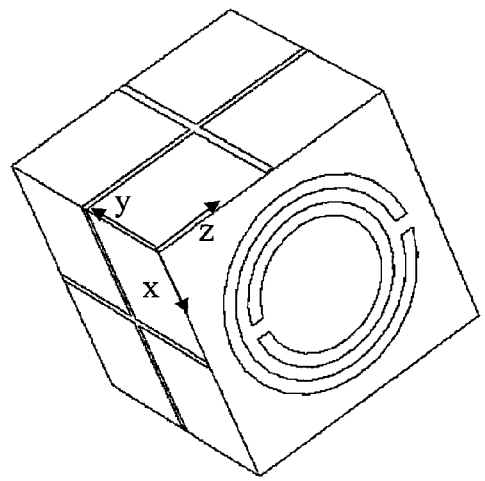
Figure 9C:
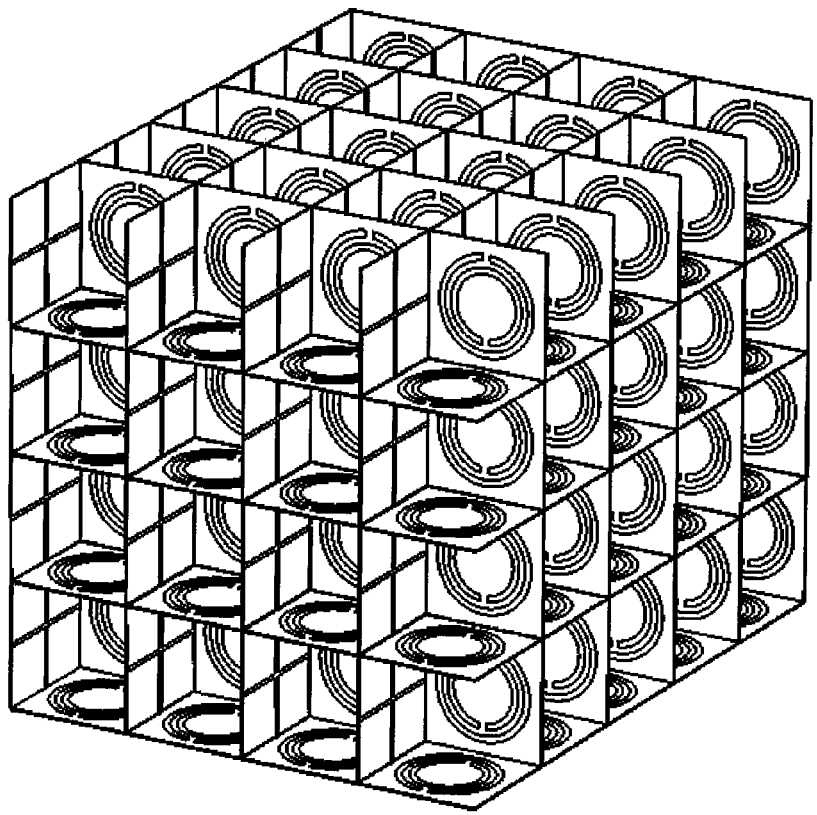

FIG. 9. The basic structure of an exemplary structure for use in the present invention. FIGS. 9(a) and 9(b) show portions of a unit cell from different sides. FIG. 9(c) shows an assembly of units cells.

FIG. 10. An exemplary embodiment of a rectangular waveguide schematically shown previously in FIG. 5.

FIG. 11. An exemplary embodiment of a generally cylindrical waveguide in accord with the present invention.

DETAILED DESCRIPTION OF THE INVENTION

Our recent publications [G. D'Aguanno, et al., *Laser Physics*, vol. 15, p. 590 (2005); G. D'Aguanno, et al., *Phys. Rev. Lett.*, vol. 93, p. 213902 (2004); both incorporated herein by reference] illustrated striking similarities in the optical properties of one dimensional (1D) Photonic Band Gap (PBG) materials and certain metamaterials that we call ZIMs. A typical 1D-PBG consists of a multilayer stack of alternating high and low refractive index materials. The transmittance spectrum of the 1D-PBG has a gap (sometimes called a stop band or reflecting band) whose width and depth depend primarily on the index contrast of the layers and number of periods, respectively. The transmittance spectrum of a single layer of a NIM-like metamaterial also has a band gap. The width of the gap in a NIM-like metamaterial is dependent upon the separation of the electric and magnetic plasma frequencies and its depth depends on the thickness of the layer. Devices in accordance with the present invention preferably have the unit cell of the NIM-like metamaterial small enough that the optical properties can be described by the macroscopic parameters $\in$ and $\mu$, the electric permittivity and magnetic permeability, respectively. Other similarities between a single layer of a NIM-like metamaterial and a 1D PBG are superluminal group velocities inside the gap where the transmittance is small and low group velocities at the band edges where the transmittance is large [G. D'Aguanno, et al., *Laser Physics* vol. 15, p. 590 (2005)].

Not all the properties of NIM-like metamaterial and 1D-PBGs are similar. For instance, the 1D-PBG has a strong field localization at both band edges while the NIM-like metamaterial has field localization at one band edge and field delocalization at the other. As we have reported elsewhere, if nonlinearities are incorporated, the 1D-PBG will support bright solitons while the NIM-like metamaterial will support both bright and dark solitons [G. D'Aguanno, et al., *Phys. Rev. Lett.*, vol. 93, p. 213902 (2004)]. Another feature of a ZIM which sets it apart from a 1D-PBG is the angular dependence of the transmittance spectrum [G. D'Aguanno, et al., *Laser Physics* vol. 15, p. 590 (2005)]. In a 1D-PBG the stop band blue shifts with increasing angle due to the change in the optical path through each layer as the refraction angle changes. The stop band in a ZIM does not shift and actually widens with increasing angle.

Devices in accord with the present invention differ from the alternating layer refractive index materials reported by Jiang and Bria because such devices do not rely on the presence of a photonic band gap structure with the elementary cell repeated on the scale of the wavelength of the incident radiation. We have analyzed and describe herein the angular dependence of the stop band and the omnidirectional reflecting properties of a metamaterial similar to previous NIMs but not necessarily a negative index material. Rather omnireflecting materials in accord with the present invention are "zero" index materials in that they exhibit a real index of refraction with magnitude less that $10^{-2}$. However, the sign of the real index may be positive or negative provided the index is sufficiently close to zero.

Previously reported omnidirectional reflectors have been made in 1D-PBGs by forming an extra wide gap [K. V. Popov, et al., *Applied Optics*, vol. 36, p. 2139 (1997); M. Deopura, et al., *Optics Letters*, vol. 26, p. 1197 (2001); E. Xifre-Perez, et al., *J. Appl. Phys.*, vol. 97, p. 064503 (2005)]. In such PBGs, the idea is to make the normal incidence gap extremely wide so that the shift with angle is not large enough to completely move the entire stop band to a new range of frequencies. The gap in a 1D-PBG can be widened by having a very large index contrast and/or by adding more periods with different lattice constants.

Omnidirectional ZIM reflectors in accordance with the present invention do not have these constraints since the gap does not shift and actually widens with increasing angle of incidence. A convincing experimental demonstration of negative refraction was made by Shelby, Smith, and Schultz [R. A. Shelby, et al., *Science*, vol. 292, p. 77 (2001)]. They constructed a 2D NIM consisting of metal wires for the electric response and split ring resonators (SRRs) for the magnetic response. According to their experimental results, the complex, frequency dependent electric susceptibility ∈ and the magnetic permeability µ of a NIM can be modeled as follows [Id.; R. W. Ziolkowski and E. Heyman, *Phys. Rev. E*, vol. 64, p. 056625 (2001)]:

$$\in(\omega) = 1 - (\omega_{ep}^2 - \omega_{eo}^2)/(\omega^2 - \omega_{eo}^2 + i\gamma\omega) \quad (1)$$

$$\mu(\omega) = 1 - (\omega_{mp}^2 - \omega_{mo}^2)/(\omega^2 - \omega_{mo}^2 + i\gamma\omega) \quad (2)$$

where $\omega_{ep}$ is the electric plasma frequency; $\omega_{eo}$ is the electric resonance frequency; $\omega_{mp}$ is the magnetic plasma frequency; $\omega_{mo}$ is the magnetic resonance frequency; and γ the loss term. The parameters are taken according to the experimental results reported by Shelby, et al. [R. A. Shelby, et al., *Science*, vol. 292, p. 77 (2001)], i.e.: $\omega_{ep} = 2\pi \times 12.8$ GHz, $\omega_{eo} = 2\pi \times 10.3$ GHz, $\omega_{mp} = 2\pi \times 10.95$ GHz, $\omega_{mo} = 2\pi \times 10.05$ GHz, $\gamma = 2\pi \times 10$ MHz. In the following discussion, the material parameters of the NIM from Eqns. 1 and 2 are assumed to be isotropic, that is, we are assuming a fully 3D NIM structure. The NIM reported in [R. A. Shelby, et al., *Science*, vol. 292, p. 77 (2001)] is actually a combination of a 1D electric and 2D magnetic metamaterial. The experimental results of negative refraction by Shelby, et al. were demonstrated for TE polarization with the incident electric field always parallel to the metal wires. Therefore, we expect the NIM of Shelby et al. to display omnidirectional reflection for only TE polarization. A true omnidirectional reflector in accordance with the present invention requires a 3D ZIM structure.

The optical constants for a material can be defined as $N = \pm(\in\mu)^{1/2} = \pm(n+iK)$, where N is the complex index of refraction, n is the index of refraction, and K is the extinction coefficient. The sign in front of the square root must be chosen in a way that ensures the Poynting vector of the light, refracted into a semi-infinite slab of NIM-like metamaterial, will always be directed away from the interface and into the refracting material itself [G. D'Aguanno, et al., *Laser Physics*, vol. 15, p. 590 (2005); G. D'Aguanno, et al., *Phys. Rev. Lett.*, vol. 93, p. 213902 (2004)]. FIG. 1(*a*) shows the optical constants for the material parameters described above. FIG. 1(*b*) shows the optical constants for the same material parameters as in FIG. 1(*a*) with the exception that the electric plasma frequency has been moved to $\omega_{ep} = 2\pi \times 25$ GHz. Notice that a gap forms between the electric and magnetic plasma frequencies. On the low frequency side of the gap is the region of negative refractive index.

Inside the gap, the optical constants of the NIM are similar to a metal at optical frequencies with a small index of refraction and a small but finite extinction coefficient. FIG. 1(*c*) shows the absolute value of the refractive index data of FIG. 1(*a*) on a logarithmic graph. FIG. 1(*d*) similarly depicts the refractive index data of FIG. 1(*b*). FIGS. 1(*c*) and 1(*d*) illustrate the rapid reduction in the magnitude of the index between the plasma frequencies.

For comparison, the optical constants of silver at λ=620 nm are n=0.131 and K=3.88 [*Handbood of Optical Constants of Solids*, edited by E. D. Palik, p. 356 (Academic, New York, 1985)]. Metals are good reflectors at optical frequencies because the refractive index is close to zero and K is reasonably large. ZIMs reflect radiation more efficiently than metals because the refractive index is essentially zero inside the gap. Comparing FIG. 1(*a*) with FIG. 1(*b*) illustrates the dependence of the gap on the choice of $\omega_{ep}$ and $\omega_{mp}$. Increasing the separation of the electric and magnetic plasma frequencies has expanded the width of the gap by a factor of five. We have reported elsewhere [G. D'Aguanno, et al., *Laser Physics*, vol. 15, p. 590 (2005); G. D'Aguanno, et al., *Phys. Rev. Lett.*, vol. 93, p. 213902 (2004)], that the width and center frequency of the gap can be written as $\Delta\omega \sim |\omega_{ep} - \omega_{mp}|$ and $\omega_c \sim (\omega_{ep} + \omega_{mp})/2$, respectively. Therefore, the larger the separation between the electric and magnetic plasma frequency, the wider is the spectral region where the ZIM behaves as an omnidirectional reflector.

Figure 1A:
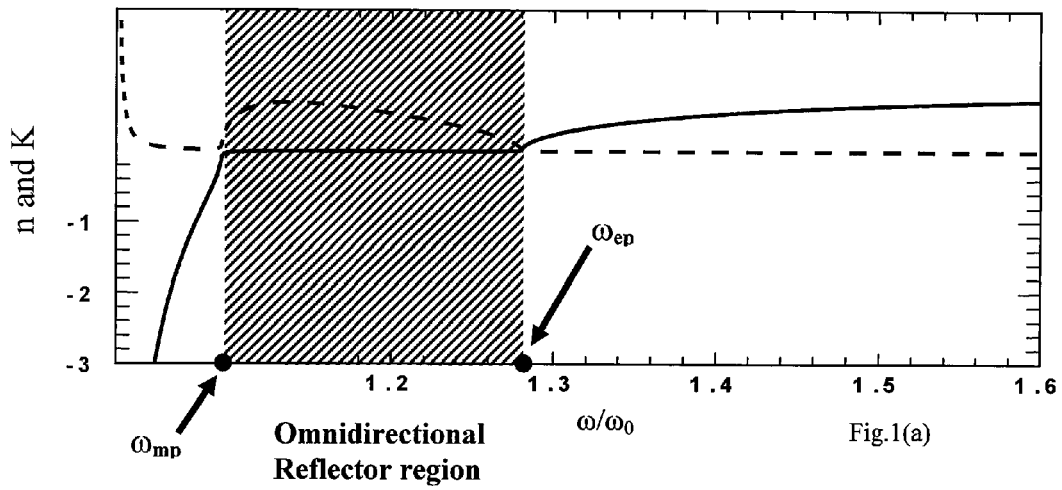
FIG. 1(a) plots index of refraction n (solid line) and extinction coefficient K (dashed line) vs. $\omega/\omega_0$ where $\omega_0 = 2\pi \times 10$ GHz; optical constants are based on the experimental parameters of R. A. Shelby, et al., *Science*, vol. 292, p. 77 (2001).
Figure 1B:
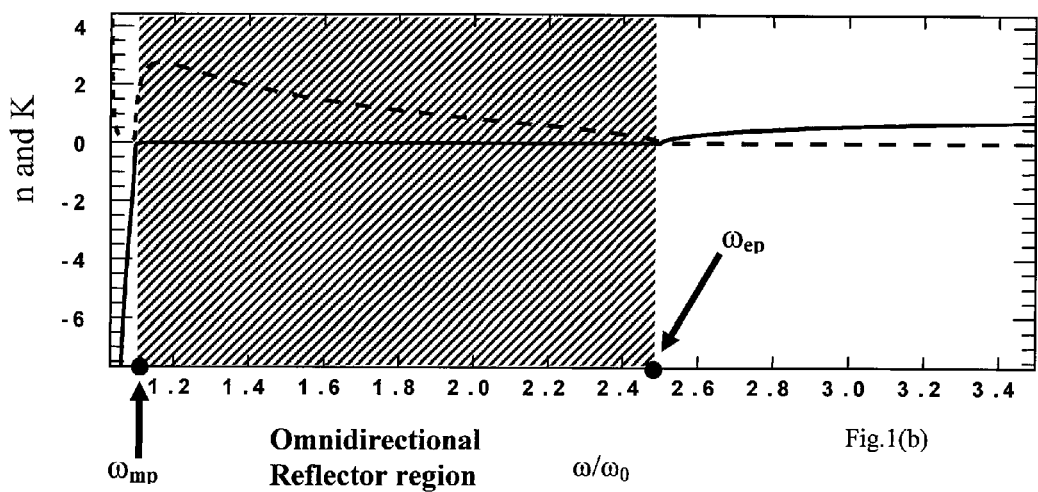
In FIG. 1(b) we use the same parameters as in FIG. 1(a) except that $\omega_{ep} = 2\pi \times 25$ GHz.
Figure 1C:
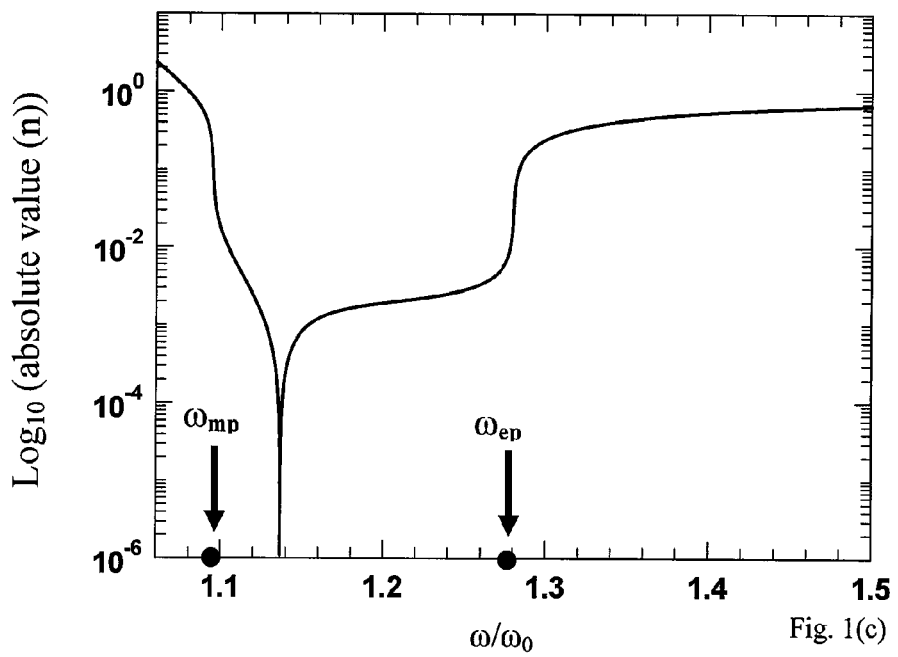
FIG. 1(c) plots the log of the absolute value of the refractive index data of FIG. 1(a).
Figure 1D:
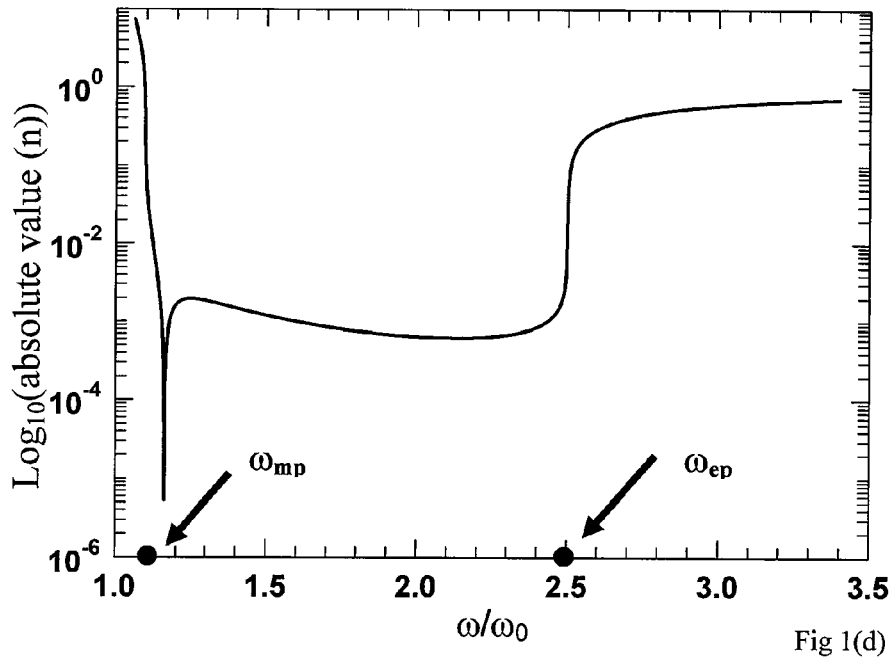
FIG. 1(d) plots the log of the absolute value of the refractive index data of FIG. 1(b).
Figure 2:
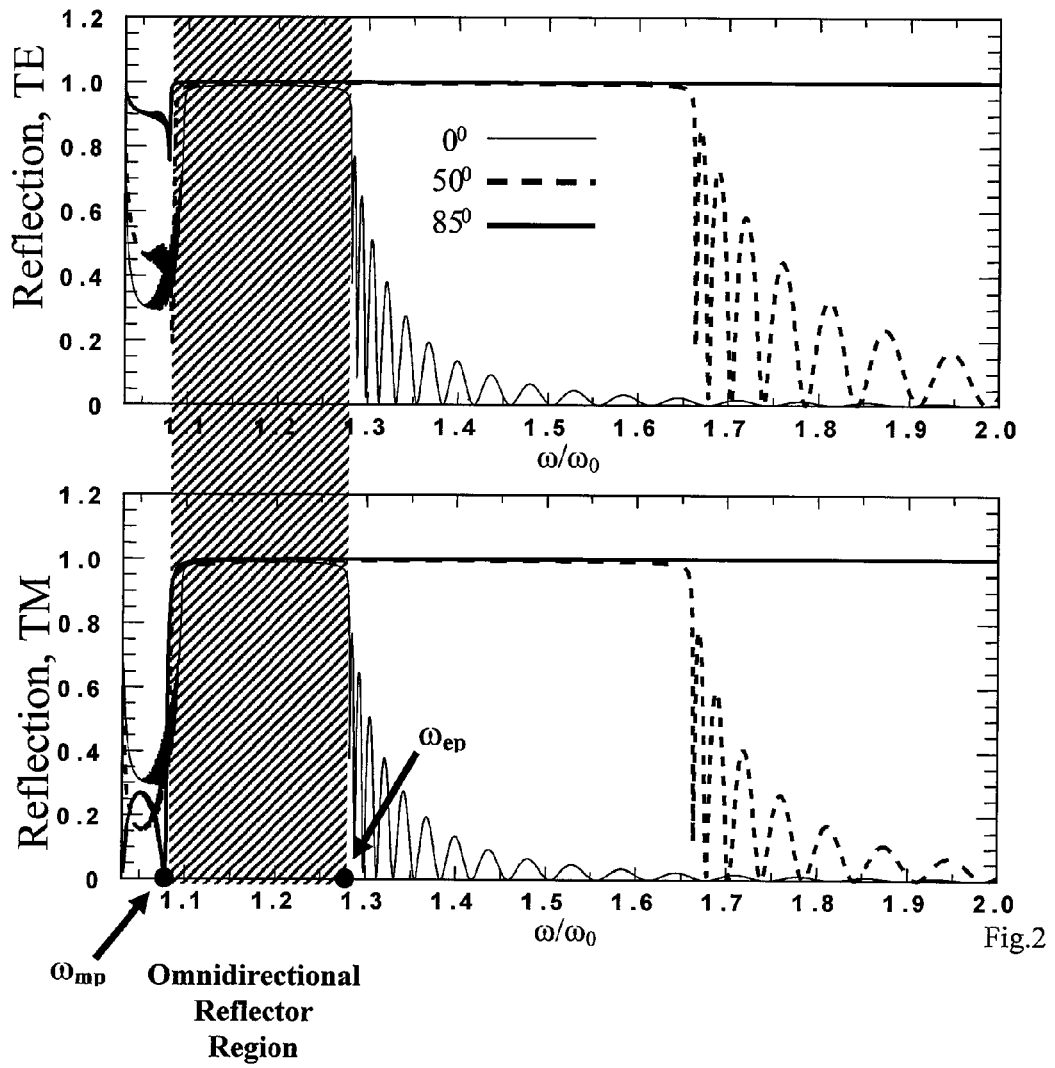
FIG. 2 Angular reflectivity of TE (transverse electric) and TM (transverse magnetic) polarized light for the optical constants shown in FIG. 1(a). The shaded area indicates the spectral position of the omnidirectional gap.

In FIG. 2 we plot the reflectivity from a single layer of NIM-like material having the optical constants shown in FIG. 1(*a*). The reflectivity has been calculated by the standard matrix transfer method. The structure is $L = 5\lambda_0$ in thickness where $\lambda_0 = 2\pi c/\omega_0 = 3$ cm. At normal incidence, the highly reflecting band occupies the region between the magnetic plasma frequency and the electric plasma frequency of the ZIM. At the steeper angles of incidence, the low frequency side of the reflecting band remains fixed at the magnetic plasma frequency. On the high frequency side of the gap where the material has a positive index of refraction, the reflecting band begins to widen as the angle of incidence increases. In this frequency region, the optical constants of the material are similar to a low loss dielectric with the exception that the index of refraction is less than unity. The radiation is propagating from a high index region to a low index region and the highly reflecting band terminates when the angle of incidence is less than the angle required for total internal reflection.

Figure 3:
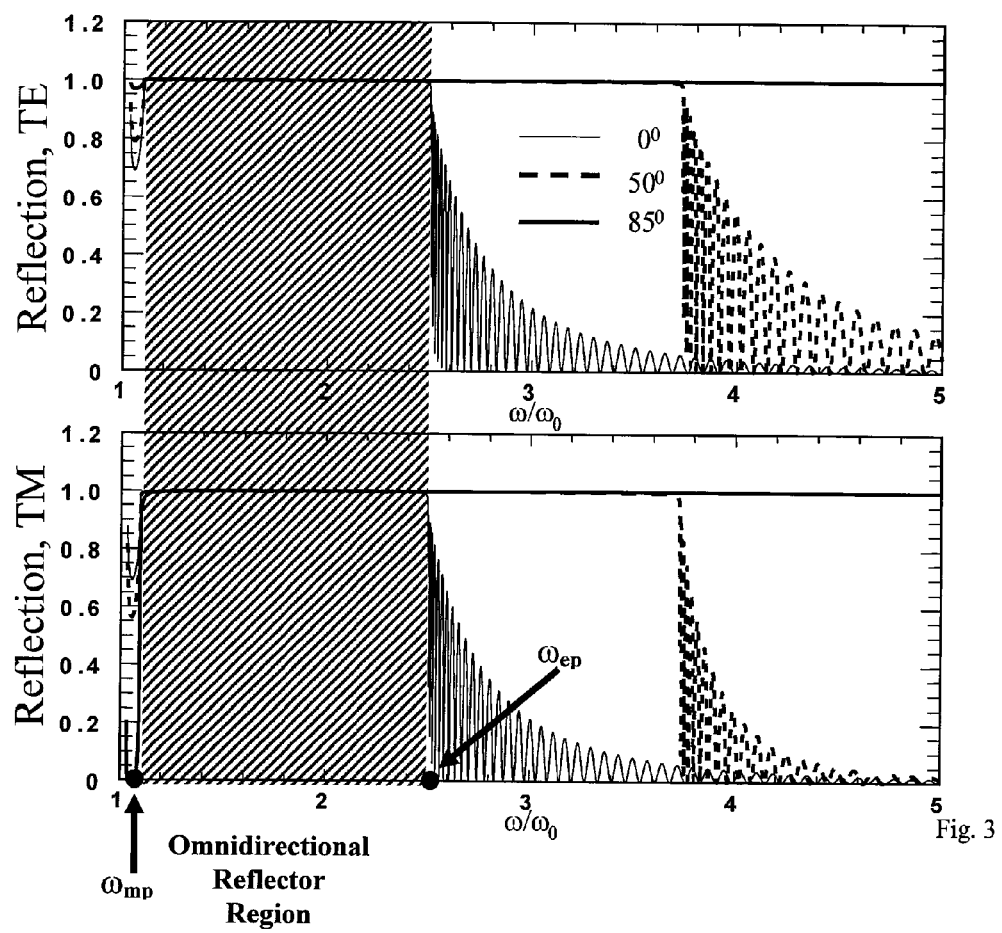
FIG. 3 Angular reflectivity of TE and TM polarized light for the optical constants shown in FIG. 1(b). The shaded area indicates the spectral position of the omnidirectional gap.
Figure 4A:
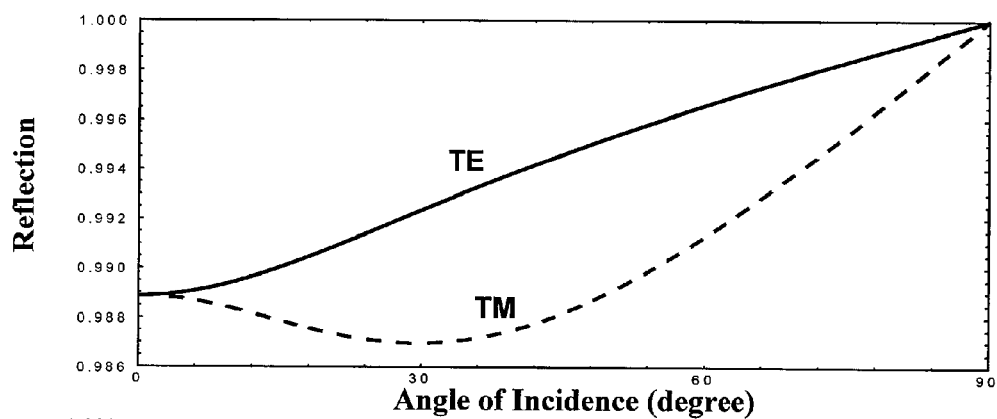
FIGS. 4(a) and 4(b) are calculated using the optical constants of FIG. 1(a) and 1(b) respectively.
Figure 4B:
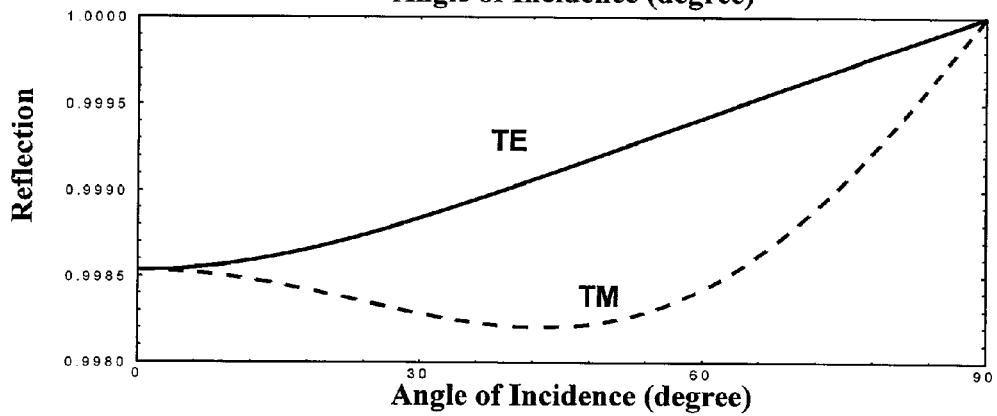

In FIG. 3 we show that increasing the separation between the magnetic plasma frequency and the electric plasma frequency can expand the omnidirectional reflecting band. The optical constants used to calculate the reflectivity are plotted in FIG. 1(*b*). By moving the electric plasma frequency from $\omega_{ep} = 2\pi \times 12.8$ GHz to $\omega_{ep} = 2\pi \times 25$ GHz, the omnidirectional reflecting band has increased from $\Delta\omega/\omega_c \sim 15\%$ to $\Delta\omega/\omega_c \sim 78\%$. The overall features of FIGS. 2 and 3 are similar with the exception that the width of the omnidirectional reflecting band has increased fivefold by shifting the electric plasma frequency. For the center gap frequency, FIG. 4 shows the complete angular dependence of the reflectivity for TE and TM polarizations. The polarization dependence shown in FIG. 4 is reminiscent of a metal with the TM polarization showing a reduced reflectivity relative to TE polarization. The unusual feature illustrated in FIG. 4 is that the reflectivity for all angles and polarizations never drops below 98.6%. The reflectivity plots of FIGS. 3 and 4 show that the larger separation between the electric and magnetic plasma frequencies not only makes the omnidirectional reflecting band wider but also deeper. The center gap reflectivity for the NIM having $\Delta\omega/\omega_c \sim 78\%$ is never less than 99%.

Therefore we have demonstrated that a single layer of a ZIM has omnidirectional reflecting properties in the region between the electric and magnetic plasma frequencies. In this frequency region, the optical constants of a ZIM are similar to real metals at optical frequencies. However, the reflecting properties of ZIMs are far superior to ordinary metals as a result of the real part of the index of refraction being nearly zero.

While our calculations have been done in the microwave regime following the experimental data reported by R. A. Shelby, et al., *Science*, vol. 292, p. 77 (2001), advancements in the field of negative index materials [S. O'Brien and J. B. Pendry, *J. Physics: Condens. Matter*, vol. 14, p. 6393 (2002); S. O'Brien, et al., *Phys. Rev B*, vol. 69, p. 241101(R) (2004); Pendry, *Opt. and Photon. News*, vol. 15, No. 9, p. 33 (2004); S. Linden et al., *Science*, vol. 306, p. 1351 (2004)] have suggested that NIMs with similar dispersion relations could also be available in the near future in the mid and near infrared regime. More recently, Kochergin has disclosed in Patent Application US 2005/0221128 (incorporated herein by reference) NIM-like metamaterials and methods for manufacture of NIM-like metamaterials including techniques which can be applied to manufacture the 3D ZIM required for an omnidirectional reflector in accordance with the present invention.

As already stated, the omnidirectional reflector properties of a slab of ZIM originate in the transition region where the refractive index is practically zero and an intrinsic gap for the electromagnetic radiation is formed. The opaque region described in FIGS. 1-3 represents an intrinsic gap for the electromagnetic radiation different in nature from the gap formed in photonic band gap (PBG) structures, but with similar pictorial characteristics. In PBG structures the formation of the gap is due to destructive interference caused by the periodic arrangement of scattering or diffracting elements whose sizes are on the order of the incident wavelength. In contrast, NIM-like materials are structured on a much finer scale that ranges from $1/10^{th}$ to $1/1,000^{th}$ of the wavelength [J. Pendry, *Opt. and Photon. News*, vol. 15, No. 9, p. 33 (2004)], and therefore they respond with an effective dispersion that is essentially due to the bulk properties of the medium. However, while the nature of the gap is different in the two cases, we explore the possibility of using ZIMs as the cladding of a waveguide (see FIG. 5).

In what follows we use for simplicity a lossy Drude model in order to describe the electric susceptibility and the magnetic permeability of the ZIM:

$$\varepsilon(\tilde{\omega}) = 1 - \frac{1}{\tilde{\omega}(\tilde{\omega} + i\tilde{\gamma}_e)}, \mu(\tilde{\omega}) = 1 - \frac{(\omega_{mp}/\omega_{ep})^2}{\tilde{\omega}(\tilde{\omega} + i\tilde{\gamma}_m)}, \quad (3)$$

where $\tilde{\omega}\omega/\omega_{ep}$ is the normalized frequency, $\omega_{ep}$ and $\omega_{mp}$ are the respective electric and magnetic plasma frequencies, $\tilde{\gamma}_e = \gamma_e/\omega_{ep}$ and $\tilde{\gamma}_m = \gamma_m/\omega_{ep}$ are the respective electric and magnetic loss terms normalized with respect to the electric plasma frequency. The lossy Drude model describes well the behavior of the NIM-like metamaterials in the region between the electric and magnetic plasma frequency according to the experimental data reported in [R. A. Shelby, et al., *Science*, vol. 292, p. 77 (2001)]. We begin by first focusing on the TE modes. In this case the electric field is polarized along the y axis, (see FIG. 2) and the Helmholtz equation for our geometry is:

$$\frac{\partial^2 E_y(x,z)}{\partial x^2} + \frac{\partial^2 E_y(x,z)}{\partial z^2} + \frac{\omega^2}{c^2}\hat{f}(x)E_y(x,z) = 0, \quad (4)$$

where $\hat{f}(x) = \hat{n}^2$ for $x>d$ and $x<0$, while $\hat{f}(x) = n_0$ for $d \geq x \geq 0$. $\hat{n}$ is the refractive index of the NIM and $n_0$ is the refractive index of the core of the waveguide. The solution of Eq. (4) can be written as follows:

$$E_y(x,z) = \begin{cases} A_1 \exp\left[i\frac{\omega}{c}\left(n_0 z\cos\vartheta - \hat{n}x\sqrt{1 - \frac{n_0^2\cos^2\vartheta}{\hat{n}^2}}\right)\right] & x < 0 \\ \exp\left(i\frac{\omega}{c}n_0 z\cos\vartheta\right)\left[\begin{array}{l}A_2\exp\left(i\frac{\omega}{c}n_0 x\sin\vartheta\right) + \\ A_3\exp\left(-i\frac{\omega}{c}n_0 x\sin\vartheta\right)\end{array}\right] & 0 \leq x \leq d \\ C\exp\left[i\frac{\omega}{c}\left(n_0 z\cos\vartheta + \hat{n}(x-d)\sqrt{1 - \frac{n_0^2\cos^2\vartheta}{\hat{n}^2}}\right)\right] & x > d \end{cases} \quad (5)$$

where C is an arbitrary normalization constant that is chosen consistent with the following normalization condition:

$$\int_{-\infty}^{+\infty} |E_y(x, z=0)|^2 dx = 1.$$

The choice of the complex parameters $A_1$, $A_2$, $A_3$ and $\hat{\theta}$ is determined by imposing that $E_y$, as well as $(1/\mu)(\partial E_y/\partial x)$, must be continuous at both $x=0$ and $x=d$. The continuity requirements lead to the following modal equation for $\hat{\theta}$:

$$\tan\left(\frac{\omega}{c}n_0 d\sin\vartheta\right) = -i\frac{\frac{2n_0\hat{n}\sin\vartheta}{\mu}\sqrt{1 - \frac{n_0^2}{\hat{n}^2}\cos^2\vartheta}}{n_0^2\sin^2\hat{\vartheta} + \frac{\hat{n}^2}{\mu^2} - \frac{n_0^2}{\mu^2}\cos^2\vartheta}, \quad (6)$$

and to the following system of linear algebraic equations for $A_1$, $A_2$, and $A_3$:

$$\begin{pmatrix} 1 & -1 & -1 \\ \frac{\hat{n}}{\mu}\sqrt{1 - \frac{n_0^2}{\hat{n}^2}\cos^2\vartheta} & n_0\sin\vartheta & -n_0\sin\vartheta \\ 0 & \exp\left(i\frac{\omega}{c}n_0 d\sin\vartheta\right) & \exp\left(-i\frac{\omega}{c}n_0 d\sin\vartheta\right) \end{pmatrix}\begin{pmatrix} A_1 \\ A_2 \\ A_3 \end{pmatrix} = \begin{pmatrix} 0 \\ 0 \\ C \end{pmatrix}. \quad (7)$$

Figure 5:
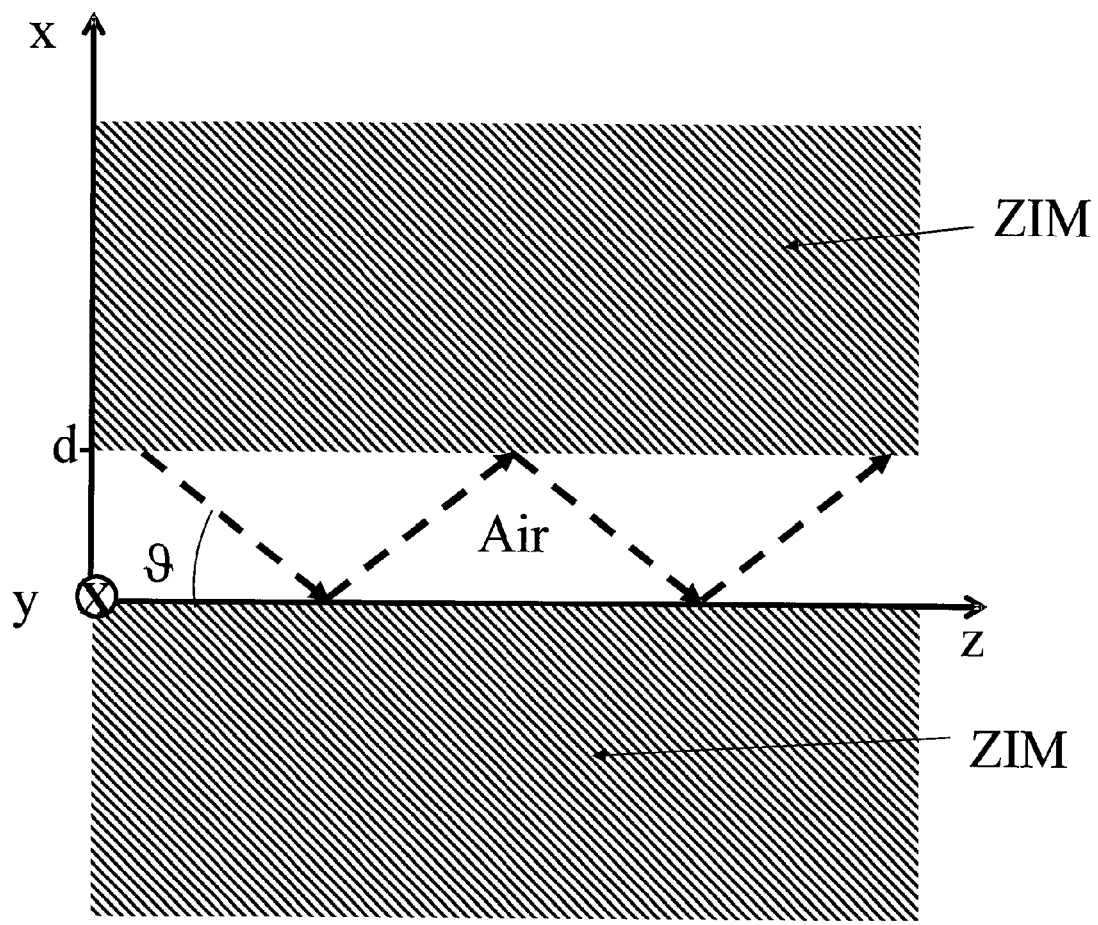
FIG. 5 Schematic representation of the geometry of an embodiment of the present invention. A core of air of thickness d is sandwiched between two identical layers of ZIM. $\theta$ is the angle formed by the wavevector of the radiation with the propagation axis z. In this analysis, the ZIM layers are taken to be semi-infinite along the z axis. The y axis is orthogonal to the plane (x,z).

We note that θ (i.e. the angle that the wavevector of the radiation forms with the propagation axis z—see FIG. 5) and the attenuation length L' (i.e. the length along z covered by the radiation before its intensity drops of a factor 1/e) are linked to the complex parameter $\hat{\theta}$ through the following relations:

$$\hat{\vartheta} = ar\cos[\text{Re}(\cos\hat{\vartheta})], \quad (8.1)$$

$$L' = \frac{c}{2\omega n_0 \text{Im}(\cos\hat{\vartheta})}. \quad (8.2)$$

The calculation for TM modes follows a development similar to that of TE modes. In the case of TM modes we must impose the continuity conditions on the magnetic field $H_y$ and on $(1/\in)(\partial H_y/\partial x)$. The solution for TM modes and the modal condition can be obtained from those calculated for TE modes by making the following formal transformations: $E_y \to H_y$ and $\mu \to \in$. In order to calculate the modes admitted by our waveguide, we have to solve Eq.(6) for TE modes and the corresponding equation for TM modes. Eq.(6) is a complex, transcendental equation that does not admit analytical solutions. It can be solved numerically by using the Newton-Raphson method [W. H. Press, et al., *Numerical Recipes in C*, pp. 362-68 (Cambridge Univ. Press, Cambridge, 1988)]. In our case the Newton-Raphson procedure is initialized with a trial solution $\hat{\vartheta}_0$ that solves the following equation:

$$\tan\left(\frac{\omega}{c} n_0 d \sin\hat{\vartheta}_0\right) = \text{Re}\left[-i \frac{\frac{2n_0 \hat{n} \sin\hat{\vartheta}_0}{\mu}\sqrt{1-\frac{n_0^2}{\hat{n}^2}\cos^2\hat{\vartheta}_0}}{n_0^2 \sin^2\hat{\vartheta}_0 + \frac{\hat{n}^2}{\mu^2} - \frac{n_0^2}{\mu^2}\cos^2\hat{\vartheta}_0}\right]. \quad (9)$$

Then, by using Eqs. (5) and (7) we can calculate the transverse mode profile for different propagation distances. In FIG. (6) we show TE guided modes for a waveguide in accord with the present invention whose core has thickness $d=2\lambda_{ep}$, where $\lambda_{ep}=2\pi c/\omega_{ep}$. The dispersion properties of the ZIM are those described in FIG. 1. The electromagnetic field is approximately tuned at the center of the opaque region of the ZIM, where $\omega=0.88\omega_{ep}$. The thickness of the core is in this case large enough to accommodate three confined modes at different angles: $\theta \cong 15.90°$ for $TE_0$, $\theta \cong 33°$ for $TE_1$, and $\theta \cong 53.9°$ for $TE_2$. the case of the fundamental mode ($TE_0$), we find an attenuation length of approximately $L' \cong 7 \times 10^4 \lambda_{ep}$. Supposing that that the waveguide operates around 10 µm, the attenuation length is approximately 0.7 m, which corresponds to a loss factor of approximately 6 dB/m.

The losses drastically drop for larger core diameters, as shown in FIG. (7), where the core is $d=14\lambda_{ep}$. In the case of FIG. 7, for an operational wavelength around 10 µm, the attenuation length of the $TE_0$ mode is approximately 240 m, the losses are approximately 0.01 dB/m, and the size of the air core is only 140 µm. In this case a waveguide in accord with the present invention accommodates a large number of modes at different angles. The first three modes are excited respectively at $\theta \cong 2.2°$, $\theta \cong 4.4°$ and $\theta \cong 6.6°$. In FIG. 8 we show the $TM_0$ mode for: a) $d=2\lambda_{ep}$ and b) $d=14\lambda_{ep}$. In the case of FIG. 8(a) the angle formed by the wavevector with the z-axis is $\theta \cong 17.3°$ and the attenuation length is $L' \cong 3.4 \times 10^4 \lambda_{ep}$, which corresponds to approximately 12 dB/m in losses for a wavelength of 10 µm. In FIG. 8(b) $\theta \cong 2.3°$, $L' \cong 1.4 \times 10^7 \lambda_{ep}$ and the losses are of the order of 0.03 dB/m. Note that in the case we have studied, the TE guided modes have longer attenuation lengths than the TM guided modes, and in the opaque region of the ZIM $\text{Re}(\in)$ is less than zero while $\text{Re}(\mu)$ is greater than zero. If we consider the opposite case, i.e. $\text{Re}(\in) > 0$ and $\text{Re}(\mu) < 0$, the TM guided modes would have a longer attenuation length than the TE guided modes.

We note that recently waveguides with an air core and a cladding made by a two-dimensional square array of silver nano-wires embedded in an air host medium have been numerically demonstrated to guide at optical frequencies more efficiently than silver waveguides [B. T. Schwartz and R. Piestun, *Appl. Phys. Lett.*, vol. 85, p. 1 (2004)]: the effective extinction coefficient of the nano-structured cladding is smaller than that of a homogeneous silver cladding. In the structure of Schwartz and Piestun, the effective index of the cladding can be made to vary in the range $0 < n < 1$, depending on the ratio between the width of the silver wires and the periodicity of the array. A metamaterial designed in this way is by definition not a NIM, and light refraction will be right handed as in standard positive index materials. In this work we have instead explored the guiding properties of a NIM-like metamaterial in its opaque region, i.e. in the region where its refractive index is close to zero, in the range $-10^{-2} < n < 10^{-2}$.

More detailed embodiments of the present invention are now discussed further. Since the omnireflecting properties of the present invention are only present in the frequency band between the electronic and magnetic plasma frequencies, it is important to be able to design the metamaterial to adjust these frequencies and advantageously adjust the bandwidth to accommodate the desired frequencies for reflection or waveguiding. Pendry and others described the electronic properties of a periodic structure of wires in a simple cubic lattice. Pendry, et al., *Phys. Rev. Lett.*, 76, p. 4773 (incorporated herein by reference). By incorporating a similar type of structure into the metamaterial of the present invention, the electronic plasma frequency of the material may be adjusted as further described below. Metamaterials with magnetic properties have previously been constructed of arrays of split-ring resonators (SRRs). By altering the density and geometry of the SRRs in a NIM-like metamaterial, one can adjust the magnetic plasma frequency of the material. See, for example, J. B. Pendry et al., *IEEE Trans. Microwave Theory & Techs.* 47, No. 11, p. 2075 (1999) (incorporated by reference).

FIG. 9 depicts the basic structure of an exemplary structure for use in the Present invention. With techniques understood by those of ordinary skill in the art, an embodiment of a ZIM in accord with the present invention may be manufactured with conventional photolithographic or other techniques for circuit board layout. The substrate may be any known insulating substrate material, either rigid or flexible according to the application as discussed below. Suitable but not exclusive options for substrate material are polycarbonate (PC), polyarylate (PAR), polyestersulfone (PES), polyimide (PI), polyethylene terephtalate (PET), and polyolefin. While PET has historically been more commonly used for flexible circuits, polymers such as PEN (polyethylene naphihalate) and polyamide-based materials such as DUPONT KAPTON films may offer improved mechanical properties, including stability.

A "unit cell" as depicted in FIG. 9(a) and FIG. 9(b) will include one or more SRRs and one or more trace crosses. It should be appreciated that the SRRs will remain discrete substructures as the unit cells are arrayed to form a metamaterial as illustrated in FIG. 9(c). In contrast, repetition of the trace crosses will cause the traces to join and form continuous sections of trace generally from one side of the material to the other. It should appreciated that the SRRs and trace crosses may be composed of, for example, copper, tin, silver, gold, or metallic alloys or other conductive material and may be preferably deposited lithographically but may also be in the form of wires disposed in the desired geometry by conventional means.

FIGS. 9(a) (interior) and 9(b) (exterior) are cutaway views of an exemplary unit cell showing, respectively, the inside and outside of three adjoining faces of the unit cell. The three faces of FIG. 9(a) may be identified with reference to the coordinate axes: xy-bottom, yz-back, and xz-left. It should be appreciated that the substrate material comprising the faces is relatively thin compared to the dimensions of the unit cell and may support an SRR or a trace cross on either of the two faces of the substrate material. FIG. 9(b) shows the opposite sides of each interior face of FIG. 9(a). Thus, it should be appreciated that the xz face has a trace cross on the interior of FIG. 9(a) and a SRR on its exterior face in FIG. 9(b). Similarly, the FIG. 9(a) yz interior face has a SRR while its opposite side has a trace cross. The xy face has a SRR interior and a trace cross exterior.

To form a complete unit cell, each planar face may be replicated parallel to itself as shown in FIG. 9(c). Those of ordinary skill in the art will appreciate that provided the substrates are thin, it does not matter for the electromagnetic properties of the metamaterial which side of a substrate face has an SRR or trace cross as long as the trace crosses are continuous across unit cell boundaries. Also, based on replication of the partial unit cell of FIGS. 9(a) and 9(b), the metamaterial of FIG. 9(c) would have every unit cell face with a SRR on one side and a trace cross on the other. This is one exemplary option but it should be appreciated that the density of the SRRs and the trace crosses need not be the same. As one non-limiting example, the SRRs, on parallel planes disposed in, e.g., the x direction may be disposed on every other plane relative to the trace crosses. Preferably, to maintain 3D isotropy, such spacing variation should be accomplished uniformly in each coordinate direction.

As an illustration of our method of controlling the omnidirectional bandwidth, consider a ZIM metamaterial as described herein with the trace crosses forming an array of perpendicular conducting traces in space. According to Pendry, et al., *Phys. Rev. Lett.*, 76, p. 4773 Equation (14):

$$\omega_{ep}^2 = \frac{2\pi c^2}{a^2 \ln\left(\frac{a}{r}\right)} \qquad (10)$$

where a is the spacing of the traces and r is their diameter. Referring again to the data of Shelby used in our FIG. 1(a), a=5 mm and r is taken as approximately a/10. Shelby measured $f_{ep}$=12.8 GHz leading to $\omega_{ep}=2\pi f_{ep}$=80 GHz experimentally. Then according to equation (10) above, we obtain $\omega_{ep}$=100 GHz which is close to the measured value. To increase the electronic plasma frequency $\omega_{ep}$, the density of trace crosses may be doubled leading to a→a/2 while keeping a/r=10. Then again according to equation (10) above, we have $\omega_{ep}$=198 GHz. Accordingly, we have shown how to obtain the result shown in FIG. 1(b) and 1(d), i.e. the case in which we have doubled the electric plasma frequency.

A generally planar structure of the metamaterial of FIG. 9 will operate as an omnireflector in accord with the present invention. Several additional features should be appreciated. We describe herein a method for controlling the bandwidth of the omnireflector by controlling the separation of the electronic and magnetic plasma frequencies. All the data graphs herein illustrate the case where the magnetic plasma frequency is lower than the electronic plasma frequency. In such case, to increase the bandwidth, one should lower the magnetic plasma frequency or raise the electronic plasma frequency. However, it is also possible to have the electronic plasma frequency lower than the magnetic plasma frequency and have omnireflection. In that case, to increase the bandwidth, the electronic plasma frequency should be lowered or the magnetic plasma frequency raised.

FIG. 10 depicts an exemplary embodiment of a rectangular waveguide as schematically shown previously in FIG. 5. Referring to FIG. 10(a), the waveguide has a top 10.1, a bottom 10.3, a left side 10.2 and a right side 10.4. FIG. 10(b) shows an enlargement of the bottom, front right corner of FIG. 10(a) showing a portion of the bottom 10.3 and the right side 10.4. The top 10.1 and bottom 10.3 are ZIM while the sides are insulating material which may be, e.g., generally solid plastic or glass. Alternatively, the supporting sides may be formed by continuing the supporting substrate material comprising the ZIM but omitting the SRRs and trace crosses in the volume forming the sides. Alternatively, a rectangular waveguide may be formed in which the sides are also ZIM.

Figures 11A, 11B, 11C:
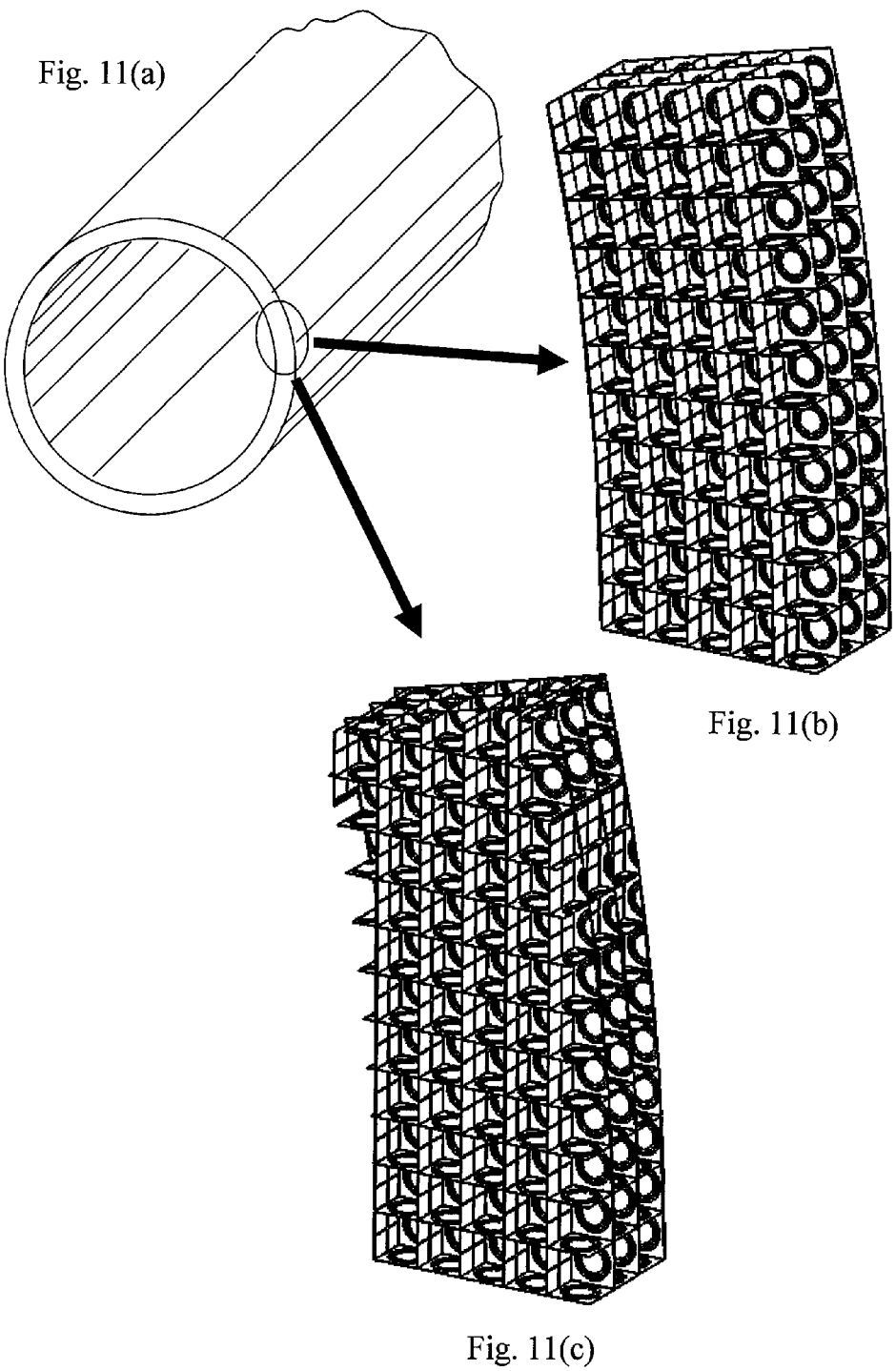

FIG. 11 depicts an exemplary embodiment of a generally cylindrical waveguide in accord with the present invention. FIG. 11(a) shows an end view of the cylinder. FIG. 11(b) depicts an enlargement of a portion of the wall of the waveguide in an exemplary embodiment. To achieve this embodiment, the ZIM is first produced using flexible substrate material. The flexible ZIM is next rolled into a tubular shape. FIG. 11(b) shows the curvature of the substrate. Those of ordinary skill in the art will appreciate that some variation in the spacing of the SRRs or trace crosses prior to rolling may be desirable to accommodate the curvature of the waveguide wall and its increasing circumference from the interior to the exterior.

FIG. 11(c) depicts an enlargement of a portion of the wall of an alternate exemplary embodiment of a generally cylindrical waveguide. In this version, the manufacturing process begins with the construction of a piece of ZIM material larger than the overall waveguide. Then the cylindrical structure is cut out from the ZIM material with, for example, a wire saw, a laser or other conventional precision cutting techniques.

Finally, as it has been noted that the unit cell dimensions of the ZIM should be substantially smaller than the wavelength of the intended incident radation, it should be appreciated that the thickness of an effective omnireflector or waveguide wall should be substantially longer than the radiation wavelength. As depicted in FIGS. 9-11, the thickness should be preferably at least four or five times the incident wavelength.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A metamaterial having a real index of refraction in the range of approximately −0.01 to approximately 0.01 and comprising a three dimensional array of split ring resonators and trace crosses wherein the resonators and crosses are supported upon intersecting generally planar substrates.

2. The metamaterial of claim 1 having a real index of refraction in the range of approximately −0.01 to approximately 0.00.

3. An omnireflector comprising the metamaterial of claim 2.

4. A hollow waveguide comprising the metamaterial of claim 2.

5. The metamaterial of claim 1 having a real index of refraction in the range of approximately 0.00 to approximately 0.01.

6. An omnireflector comprising the metamaterial of claim 5.

7. A hollow waveguide comprising the metamaterial of claim 5.

8. The metamaterial of claim 1 having a real index of refraction in the range of approximately −0.005 to approximately 0.000.

9. An omnireflector comprising the metamaterial of claim 8.

10. A hollow waveguide comprising the metamaterial of claim 8.

11. The metamaterial of claim 1 having a real index of refraction in the range of approximately 0.000 to approximately 0.005.

12. An omnireflector comprising the metamaterial of claim 11.

13. A hollow waveguide comprising the metamaterial of claim 11.

14. The metamaterial of claim 1 having a generally isotropic three dimensional structure.

15. An omnireflector comprising the metamaterial of claim 1.

16. A waveguide comprising the metamaterial of claim 1.

17. The waveguide of claim 16 wherein the waveguide comprises:
- a first generally planar structure comprised of the metamaterial of claim 1;
- a second generally planar structure comprised of the metamaterial of claim 1 in generally parallel spaced relation to the first generally planar structure; and
- means for connecting and supporting the first and second generally planar structures.

18. The waveguide of claim 17 wherein the space between the first and second generally planar surfaces is filled with air.

19. The waveguide of claim 16 wherein the waveguide comprises a generally cylindrical hollow structure.

20. The waveguide of claim 19 wherein the hollow is filled with air.

* * * * *